(12) United States Patent
Velicer et al.

(10) Patent No.: US 7,233,284 B2
(45) Date of Patent: Jun. 19, 2007

(54) HANDHELD GPS JAMMER LOCATOR

(75) Inventors: Gregory Joseph Velicer, Ridgecrest, CA (US); Robert Lee Joy, Jr., Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 53 days.

(21) Appl. No.: 11/288,069

(22) Filed: Nov. 22, 2005

(65) Prior Publication Data

US 2007/0115175 A1    May 24, 2007

(51) Int. Cl.
*G01S 5/04* (2006.01)

(52) U.S. Cl. .................. 342/433; 342/357.06

(58) Field of Classification Search ............... 342/433, 342/357.06, 432
See application file for complete search history.

(56) References Cited

U.S. PATENT DOCUMENTS

| | | | | |
|---|---|---|---|---|
| 5,818,389 | A * | 10/1998 | Lazar | 342/383 |
| 6,771,220 | B1* | 8/2004 | Ashe et al. | 342/417 |
| 2004/0013170 | A1* | 1/2004 | Fritzrandolph | 375/147 |
| 2006/0287822 | A1* | 12/2006 | Twitchell et al. | 342/357.06 |

* cited by examiner

*Primary Examiner*—Thomas H. Tarcza
*Assistant Examiner*—F H Mull
(74) *Attorney, Agent, or Firm*—David S. Kalmbaugh

(57) ABSTRACT

A handheld GPS jammer locator for locating a GPS jamming signal generated by a jammer. The handheld GPS jammer locator has two modes of operation, a amplitude mode and a difference finding mode. The amplitude measures the strength of an incoming GPS jamming signal and the difference finding mode determines the direction of the incoming jamming signal.

20 Claims, 7 Drawing Sheets

HANDHELD GPS JAMMER LOCATOR

BACKGROUND OF THE INVENTION

1. Field of the Invention

The present invention relates generally to electronic countermeasures. More specifically, the present invention relates to a handheld electronic device which is useful in locating a GPS jammer signal.

2. Description of the Prior Art

Emitting sources such as GPS jammers can be accurately located by highly classified airborne and space tracking devices. However these devices are few in number and may not be available in a timely manner. Also, visual confirmation of jammers at close range is not generally possible. The use of a handheld or mini remote piloted vehicles complement the capability of these devices to permit pinpoint destruction of the emitters, especially if the emitters are small and dispersed in large numbers.

Anti-jam capabilities incorporated in GPS receivers are limited in the number of simultaneously received jamming signals which can be suppressed. A large number of inexpensive jammers, as is expected to be deployed in a wartime scenario, will therefore render the GPS receivers useless. Such a situation also calls for a locating device capable of attacking the jammers without a large amount of collateral damage or excessive cost.

Vehicle mounted signal identification and location systems are large and expensive. The military's man portable LMRFDS system weighs 60 pounds, requires two soldiers to carry the system, and must be set up on the ground. The LMRFDS system is designed to be used against a wide variety of signals over a large frequency range, thus the system is complex and requires extensive training to operate. It and several other military used locating systems are to be replaced by the vehicle mounted Prophet Block system, leaving no man portable signal location systems in the military's inventory.

Technology is presently available for the production of small, inexpensive GPS jammers by potential adversaries, and these are beginning to appear, as has been noted in open literature. In a wartime environment, it is anticipated that these GPS jammers will be placed in or very near sensitive civilian facilities to prevent their destruction by large warhead precision guided munitions or anti-radiation missiles and without civilian casualties. In a peacetime environment, it is anticipated that these devices will be placed near airports or other facilities relying on GPS data. Even unintentional GPS jammers have been reported (i.e. active VHF/UHF antennas not working, interference due to civilian/military testing, etc.) to cause significant troubles in routine commercial operations. Accordingly there is a need to have a device which is hand held for use by ground personnel to locate and identify the jammers.

SUMMARY OF THE INVENTION

The present invention overcomes some of the difficulties of the past including those mentioned above in that it comprises a lightweight and inexpensive, yet highly efficient and effective handheld electronics jammer locating device for determining the strength of an L1 GPS frequency jamming signal and the direction of the jamming signal. The GPS Jammer Locator has two modes of operation, an amplitude mode for determining signal strength and a difference finding mode for determining signal direction.

The GPS jammer locator consists of two small antennas separated by a half wavelength of a GPS carrier frequency. The RF signals from the antennas are then combined in a 3 DB quadrature coupler. The two RF signals output from the coupler represent two displaced antenna beams. An RF switch sequentially selects the two RF signals and then supplies the selected RF signal to a receiver, terminating the coupler output not selected during a particular time period.

The RF signals are reduced in frequency from the L1 GPS frequency of 1575.42 MHZ to an IF (intermediate frequency) signal of 70 MHZ by the receiver which includes a low noise amplifier, an RF amplifier and a balanced mixer. A log amplifier utilizes signal compression to provide a log transfer function covering IF signals within a power level range of +10 dBm to −70 dBm. The log amplifier then provides a one volt to five volt signal which represents the power level range of +10 dBm to −70 dBm for the 70 MHz IF signal. The output of the log amplifier is sequentially switched by an intergrated switch with sample and hold circuits in synchronization with the RF signal switching by the RF switch. The output signals from the sample and hold circuits are summed to determine signal strength which is an indication of approximate distance to the jammer source and differenced to indicate the azimuth direction of arrival of the jamming signal.

DETAILED DESCRIPTION OF A PREFERRED EMBODIMENT OF THE INVENTION

Figure 1:
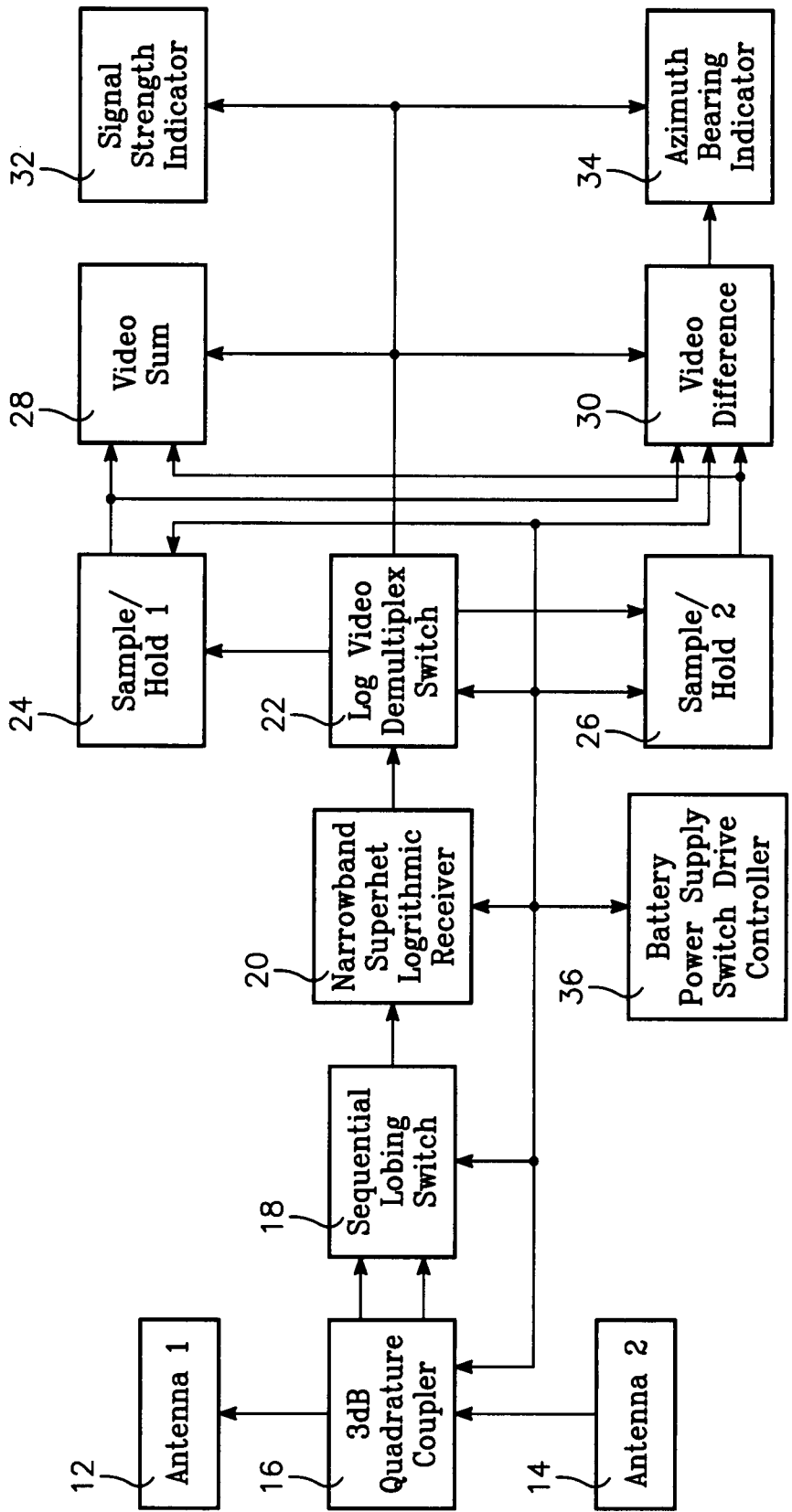
FIG. 1 is a block diagram of the handheld GPS Jammer Locator comprising the present invention.

Referring to FIG. 1, FIG. 1 illustrates a block diagram of the handheld GPS jammer locator 10 which is used to locate a source which interferes with the reception of RF signals at the GPS frequency of 1.575 GHz. GPS jammer locator 10 has two modes of operation which are an amplitude mode and a DF mode. The amplitude mode of operations indicates if an interfering source is present and detectable. In this mode, the display is a signal strength indicator. The DF mode of operation indicates a precise direction in which the interfering signal is located. In this mode the display points towards the interference. The GPS jammer locator 10 can also be turned off to conserve power. The modes or power off are selected by a switch and a single display is used to conserve power and space.

GPS jammer locator 10 operates as a single channel logarithmic amplitude receiver and an antenna system which provides two beams displaced equally about the centerline of the unit. By switching alternately between the two beams, and storing the received amplitudes, both signal strength and direction-of-arrival are obtained.

GPS jammer locator 10 consists of two small antennas 12 and 14 separated by a half wavelength of the GPS carrier frequency, which is 1.575 GHz. The antennas 12 and 14 are tuned to the GPS carrier frequency to minimize unwanted interference. The output signals from antennas 12 and 14 are combined in a 3 DB quadrature coupler 16. The two output signals from the coupler 16 represent two displaced antenna beams that are formed by the antennas 12 and 14. A solid-state switch 18 connected to coupler 16 sequentially selects the output signals from coupler 16 with the selected output signal being supplied to a narrow-band superhet logarithmic receiver 20. Switch 20 terminates the coupler output signal not selected during a given time period.

Since a GPS jammer concentrates its energy on the carrier frequency of 1.575 GHz, narrow band fixed tuned receiver 20 operates within GPS jammer locator 10 at this frequency. The bandwidth for receiver 20 is chosen to encompass the GPS signal modulation bandwidth with allowance for small frequency errors. The logarithmic IF/video section of receiver 20 is suitable for pure CW (continuous wave) signals or modulated CW signals.

The log video output signal from receiver 20 is switched sequentially by a log video switch 22 and then supplied to two video sample/hold circuits 24 and 26 in synchronization with the antenna beam switching by solid-state switch 18. The switching rate is selected to avoid errors due to modulation of the jammer signal. The output signals from sample/hold circuits 24 and 26 are summed by a video summer circuit 28 to indicate signal strength (approximate distance to the jammer source) and a video difference circuit 30 to indicate the azimuth direction of arrival of the beam. The direction of arrival indication is limited to avoid ambiguous indications in antenna side and back lobes. Signal strength indicator 32 and azimuth bearing indicator 34 represent a single display in two different modes of operation which are the approximate distance to the jammer source and the direction of arrival of the beam. The block represented by reference numeral 36 represents the control circuitry used to control the switches 18 and 22, and the power supply/battery for the circuitry of FIG. 1.

The prototype unit of the handheld GPS jammer locator 10 is packaged in a small plastic housing suitable to be held in the hand of a user and is powered by a single commercially available 9-volt battery. A folding handle and a sighting device may be also be employed as locator 10. In use, the signal strength mode of locator 10 is first used to obtain coarse direction of arrival of the GPS jamming signal and identify if serious multipath conditions exist. This is accomplished by standing in a single location with the locator pointing outward, pivoting a full 360 degrees, and noting the power reading as the user pivots. If a serious multipath does exist, the user needs to move to another location. Once an interfering source is identified with no multipath issues, the direction of arrival is obtained, and is determined utilizing the difference mode to obtain an accurate bearing for the interfering signal. Note that with direction of arrival normal to the unit package (antenna baseline) the two beam amplitudes are equal and a null (boresight) condition is indicated. This means that when the needle is in the middle of the display, the interference is straight ahead. In the amplitude mode, the needle in the display will be to the far left if no signal is present, and move from this position as the interfering signal increases in strength.

Figure 2A:
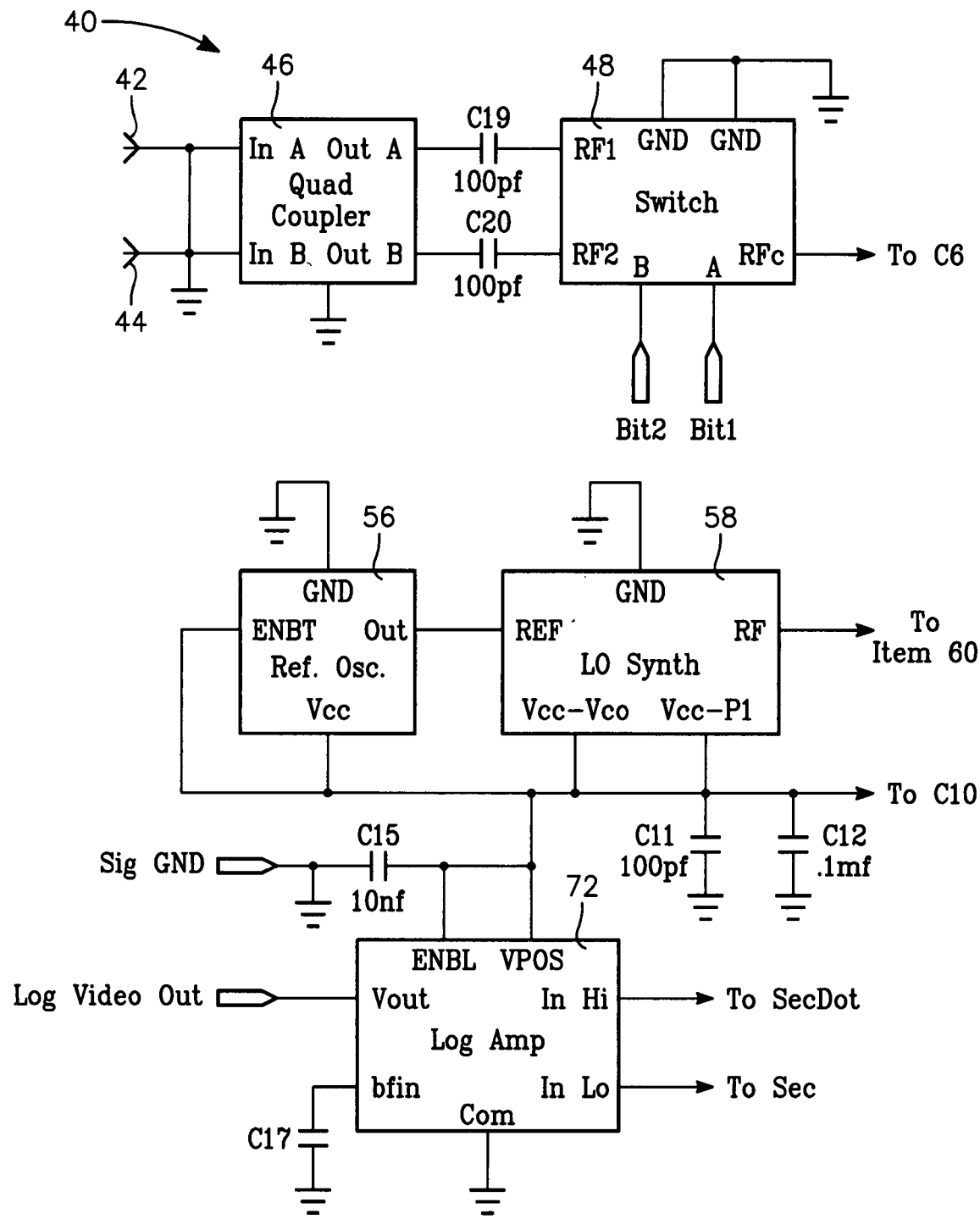
FIGS. 2A-2C illustrate an electrical schematic diagram of the GPS jammer locator RF/log IF circuit for GPS Jammer Locator of FIG. 1.
Figure 2B:
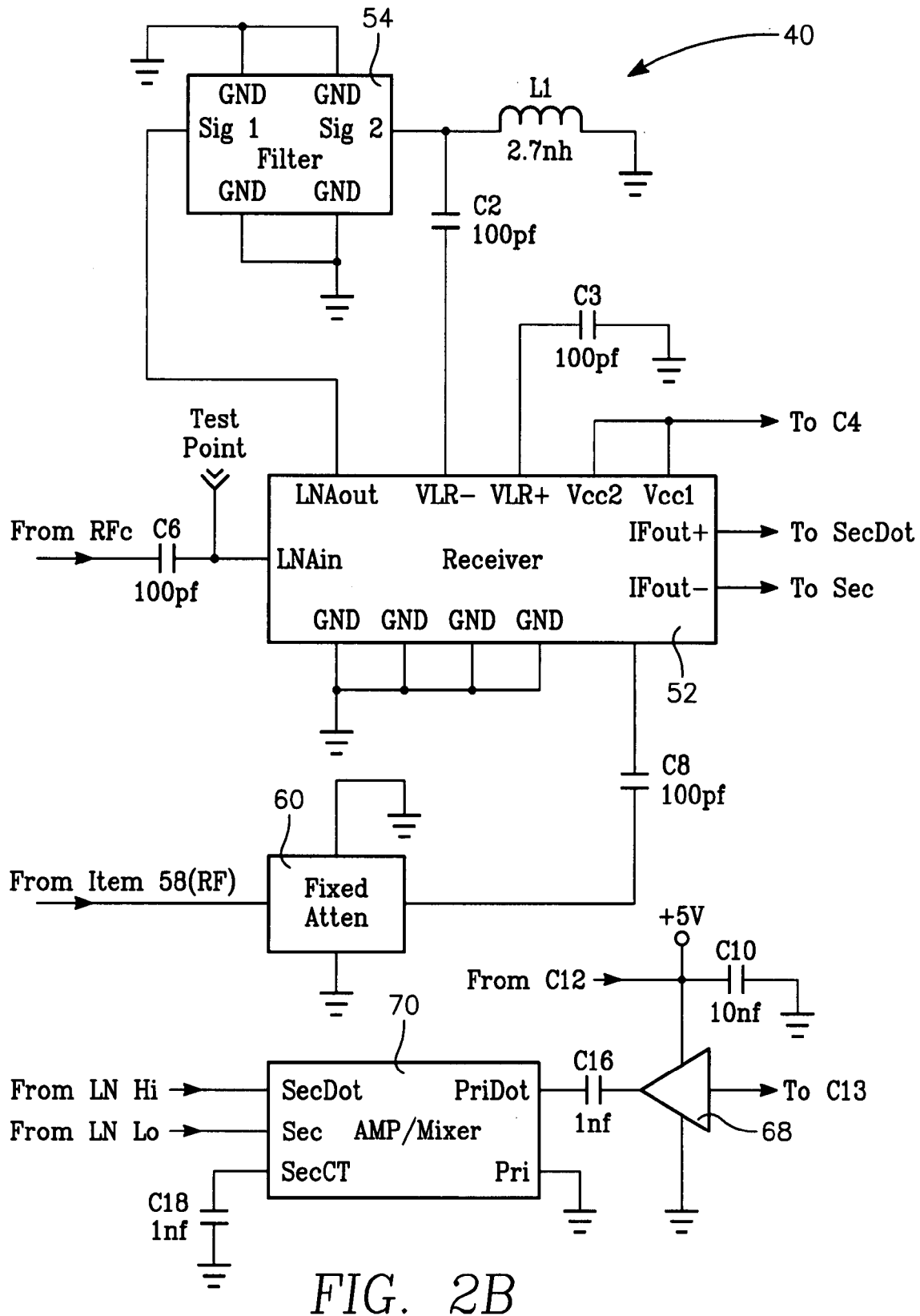
Figure 2C:
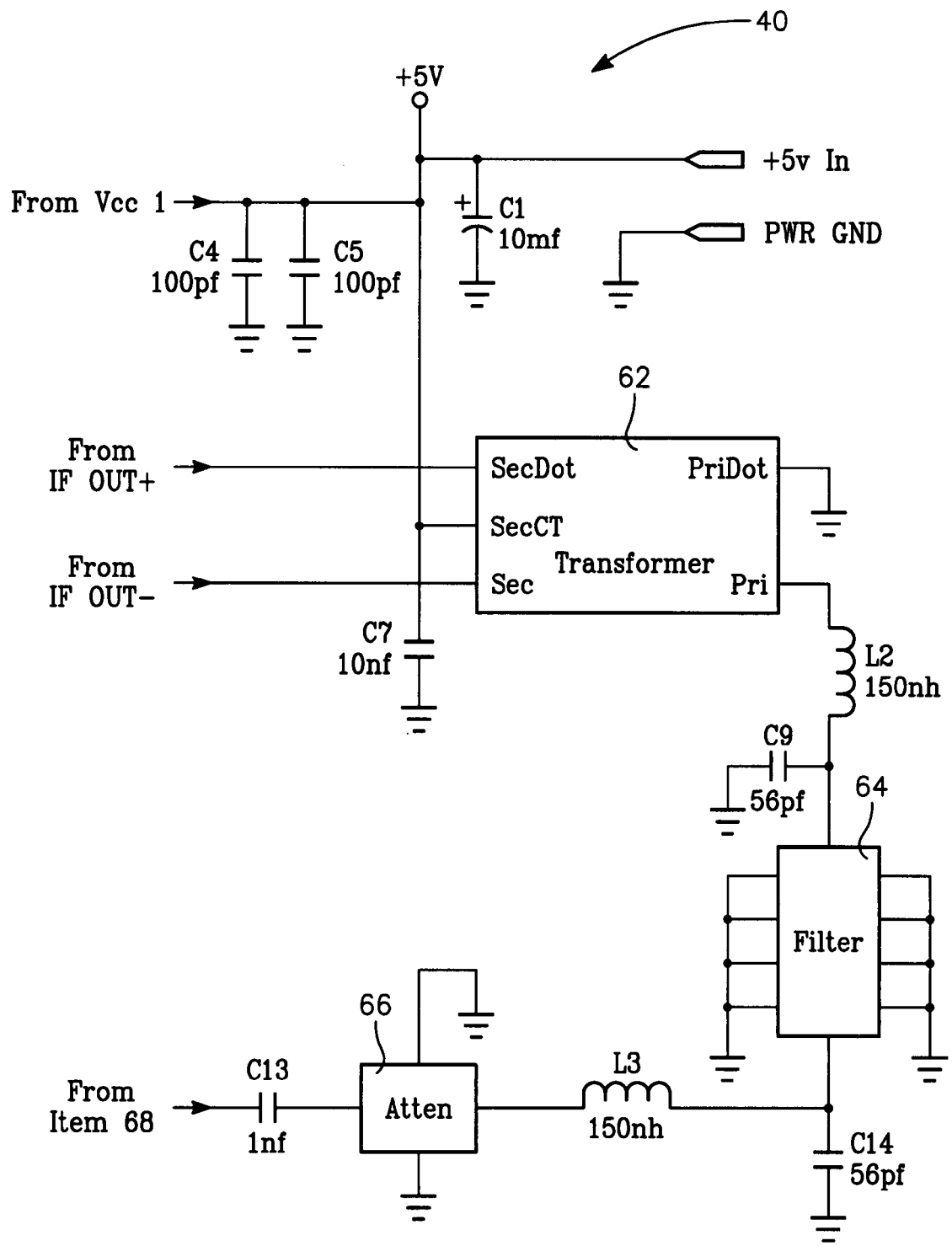

Referring to FIGS. 2A-2C, there is shown an electrical schematic diagram of the GPS jammer locator RF/log IF circuit 40 for GPS Jammer Locator 10. Circuit 40 includes a pair of GPS dielectric patch antennas 42 and 44 which are tuned for the L1 GPS frequency band. The antenna 42 and 44 are model number DAK1575MS50 flat patch antennas commercially available from TOKO America Inc. of Prospect, Ill. The signals received by antennas 42 and 44 are spaced one half wavelength apart at 1575 MHz to obtain an amplitude difference between antenna 42 and antenna 44.

It should be noted that the antennas for locator 10 could also be spaced apart by one wavelength, one half wavelength or multiple wavelengths.

The signals from antenna 42 and 44 are fed to a 3 dB quadrature coupler 46 which is an impedance matching device matching the impedance of antennas 42 and 44. The quadrature coupler is a Model 2K1305-3 3 dB Hybrid Coupler commercially available from Anaren Microwave of East Syracuse, N.Y.

The output signals from coupler 46 are supplied to an RF switch 48. When the bit1 input of switch 48 is selected, switch 48 transfers signals from antenna 42 through its RF1 input to its RFC output. When the bit2 input of switch 48 is selected, switch 48 transfers signals from antenna 44 through its RF2 input to its RFC output. The signal from the non-selected antenna 42 or 44 is terminated. The frequency range that operates switch 48 is selected by the user of handheld GPS jammer locator 10 and is generally in the range of ten hertz to one kilohertz. A programmable logic device 50 is programmed by the user utilizing program device 51 to provide logic bits to the A and B inputs of RF switch 48 to effect the switching of RF switch 48 between the output signals from antenna 42 and the output signals from antenna 44. RF switch 48 is a Hittite HMC284MS8G SPDT Non-Reflective switch commercially available from Hittite Microwave Corporation of Chelmaford, Mass.

The selected signals which are transferred through RF switch 48 are supplied to an RF low noise amplifier/mixer 52. Amplifier/mixer 52 includes an internal low noise amplifier, an RF amplifier and a balanced mixer which are utilized to implement the RF functions of a receiver. Amplifier/mixer 52 mixes the frequency of the input signal down from 1575.42 MHz to an IF (intermediate frequency) signal of 70 MHZ. The RF low noise amplifier/mixer 52 used in handheld GPS jammer locator 10 is a RF Micro Devices Inc. Model RF2411 low noise amplifier/mixer commercially available from RF Micro Devices of Greensboro, N.C. The gain provided by amplifier/mixer 52 is approximately 3 dB.

Connected to amplifier/mixer 48 is a 1575.42 MHz bandpass filter 54. The signal from RF switch 48 passes through bandpass filter 54 which filters the signal to a bandpass frequency of 1575.42 MHz and then returns the 1575.42 MHz RF signal to the rfin- input of amplifier/mixer 52. Filter 54 is a Sawtek Incorporated Model 855969 1575.42 MHz filter commercially available from Sawtek, Inc. of Orlando, Fla. Amplifier/mixer 48 also receives a local oscillator (LO) signal generated by the combination of a 10 MHz reference oscillator 56, a local oscillator synthesizer 58 which is set at 1505.42 MHz and a fixed attenuator 60. The amplifier/mixer 48 then mixes the filtered RF signal with the LO signal to generate the IF signal of 70 MHz. The output level from synthesizer 58 is +10 dBm. The attenuator 60 then attenuates the LO signal approximately 10 dB and provides the 1505.42 MHz attenuated LO signal to amplifier/mixer 48. The 70 MHz IF signal provided at the output of amplifier/mixer 70 is the difference between the 1575.42 MHz RF signal and the 1505.42 MHz LO signal.

At this time it should be noted that the local oscillator signal can also be set above the RF carrier signal of 1575.42 by 70 MHz to obtain the required IF signal of 70 MHZ. The local oscillator signal when set above the RF carrier signal is 1645.42 MHz.

The output of amplifier/mixer 52 is connected to a RF transformer 62 which operates as an impedance matching transformer. Transformer 62 is connected to a 70 MHz bandpass filter 64 which filters the incoming IF signal to a bandpass frequency of 70 MHz. Filter 64 is a Sawtek Incorporated Model 854654 70 MHz Low-Loss filter commercially available from Sawtek, Inc. of Orlando, Fla. The 70 MHz IF signal from filter 64 is supplied to an attenuator 66 which attenuates the 70 MHz IF signal and then supplied to a buffer amplifier 68.

The buffered 70 MHz IF signal from buffer amplifier 68 is supplied to a transformer 70. The transformer 70 matches the impedance of log amplifier 72 which allows for measurement of signals from high voltage levels to microvoltage levels. The log amplifier 72 utilizes signal compression to provide a log transfer function covering signals within a power level range of +10 dBm to −70 dBm. The output of log amplifier 72 is then provided as a zero volt to three volt signal which represents the power level range of +10 dBm to −70 dBm for the 70 MHz IF signal which is input to log amplifier 72.

Transformers 62 and 70 are Model MCL ADT9-1T RF transformers commercially available from Mini-Circuits of Brooklyn New York. Attenuators 60 and 66 are Model MCL-PAT fixed attenuators also commercially available from Mini-Circuits. Buffer amplifier 68 is a Model MAX2650 DC-to-Microwave, +5V Low-Noise Amplifier commercially available from Maxim Integrated Products, Inc. of Sunnyvale, Calif. Log amplifier 72 is a Model AD8310 90 dB logarithmic amplifier commercially available from Analog Devices of Norwood, Mass.

Figure 3A:
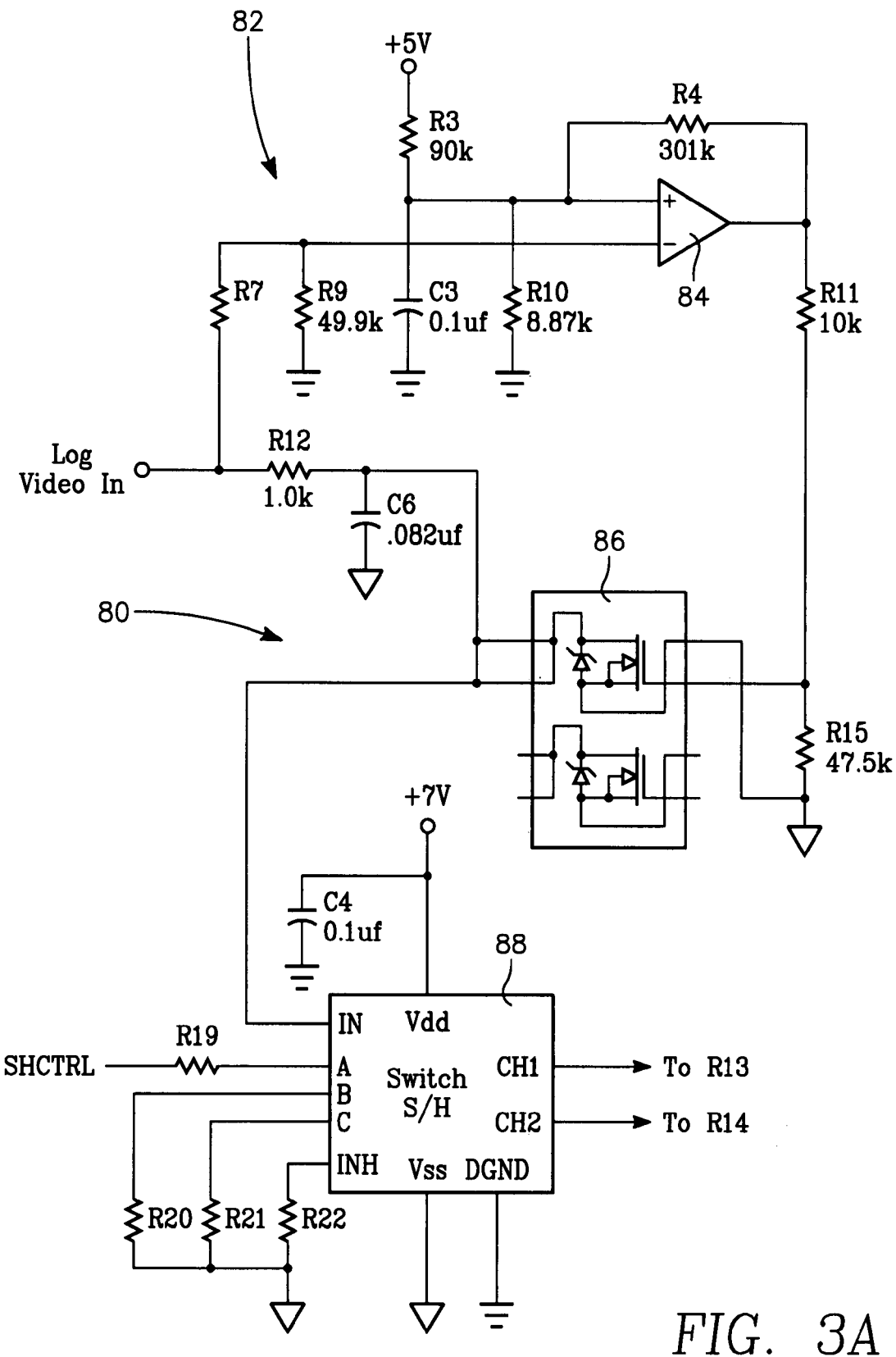
FIGS. 3A-3C illustrate an electrical schematic diagram of the GPS frequency detector video control board.
Figure 3B:
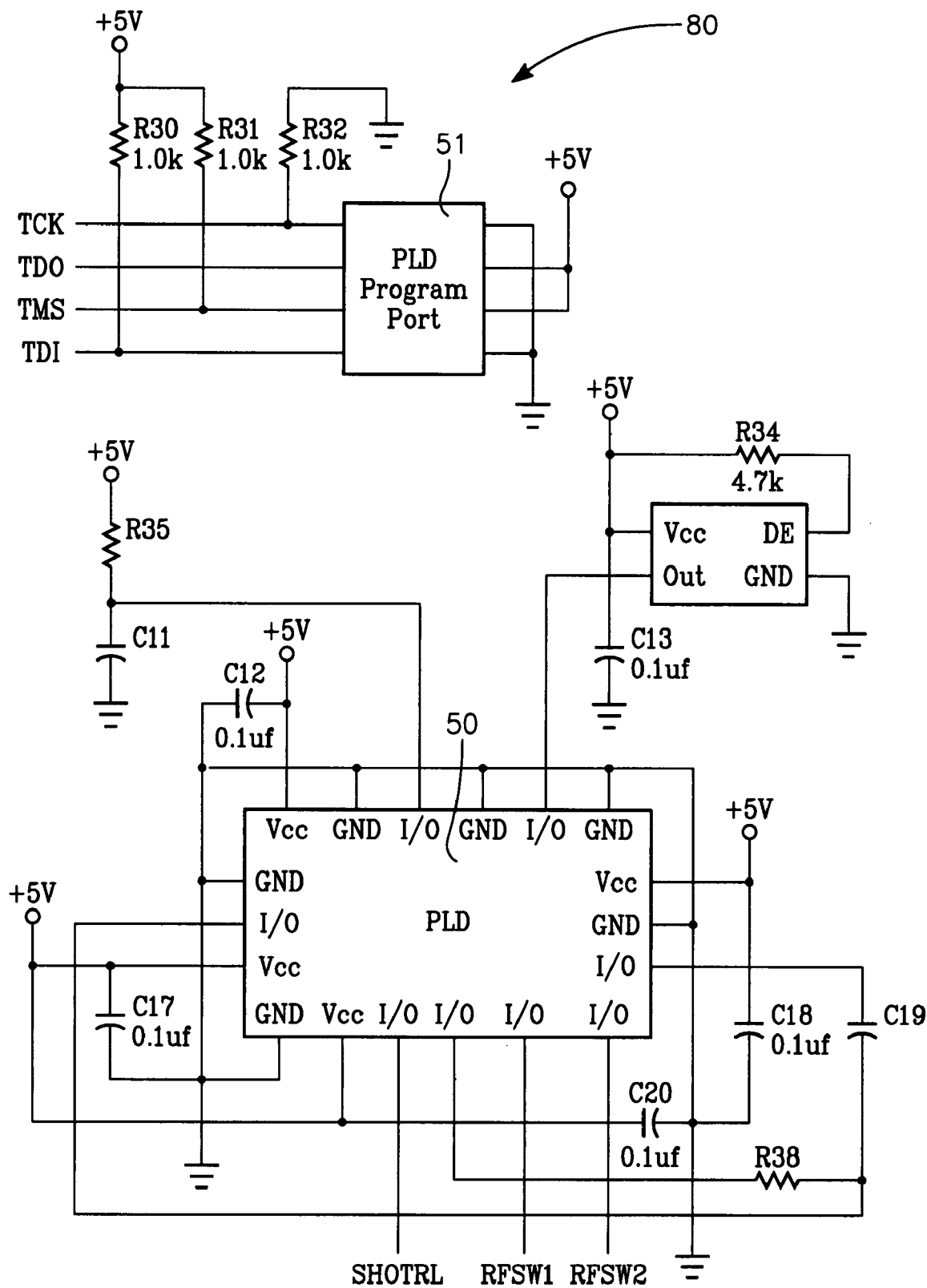
Figure 3C:
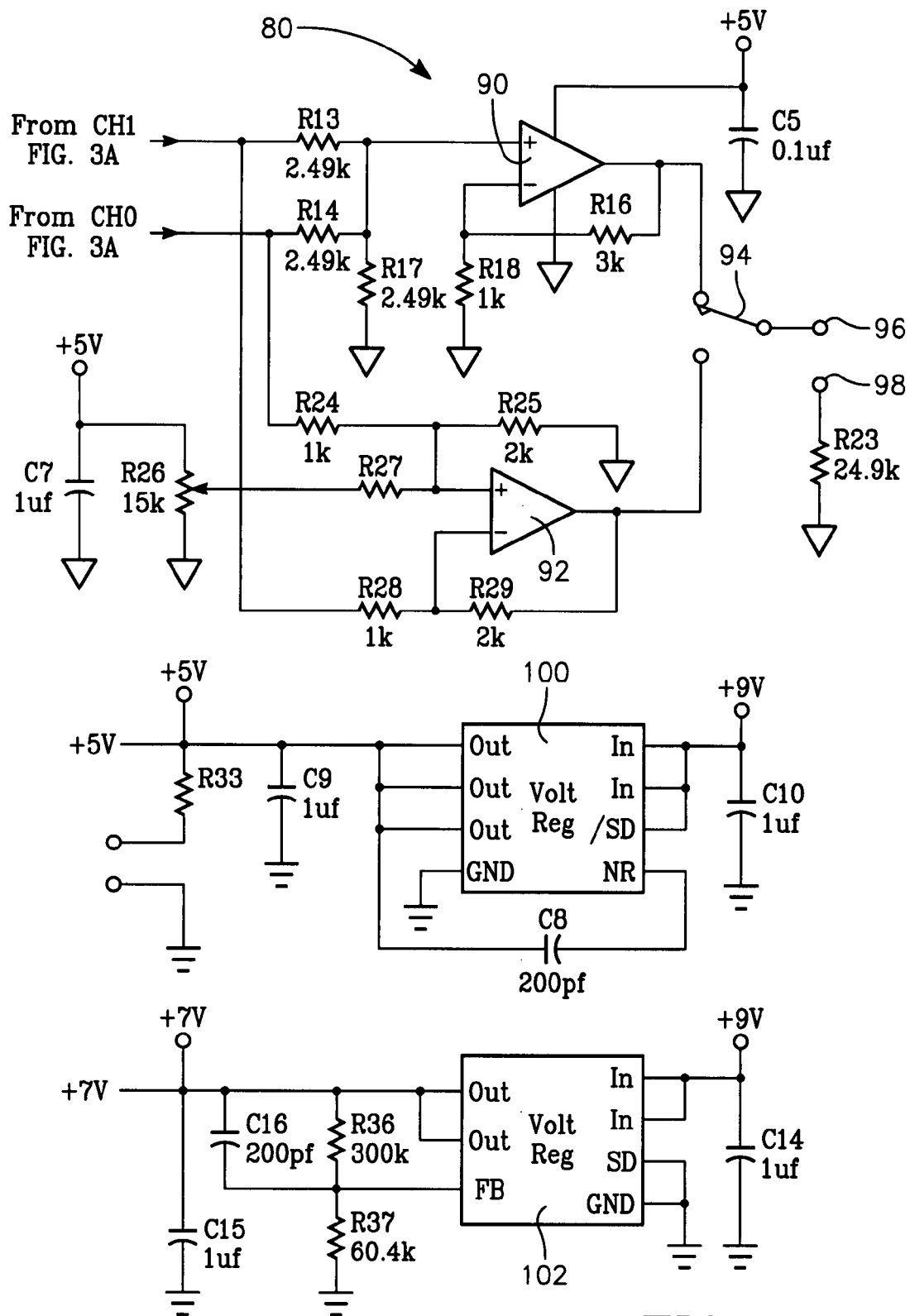

Referring to FIGS. 3A-3C, there is shown an electrical schematic diagram of the GPS frequency detector video control board 80 for jammer locator 10. The zero to three volt signal from log amplifier 72 is supplied to the log video in input of video control board 80. The signal is first provided to a comparator circuit 82 which a low power comparator 84 and a HEXFET power MOSFET 86. Comparator 84 is configured to provide a threshold such that any input signal which is below −70 dBm is clamped to ground. Signals below −70 dBm or 10 millivolts are generally noise signal and a signal below 10 millivolts triggers comparator 84 clamping the signal to zero.

Connected to the output of comparator circuit 82 is connected to a multiple channel sample and hold circuit 88 which is controlled by a sample hold control signal generated by programmable logic device 50. When the sample hold control signal from programmable logic device 50 is zero, the output from channel zero of circuit 88 is selected for a sample and hold. When the sample hold control signal from programmable logic device 50 is one, the output from channel one of circuit 88 is selected for a sample and hold. The switching rate between the channel zero output of sample and hold circuit 88 and the channel one output of sample and hold circuit 88 is identical and in phase with the switching rate for RF switch 48.

The sample and hold circuit 86 is a Model SMP08 Octal Sample and Hold Device with Multiplexed Input commercially available from Analog Devices of Norwood, Mass. The comparator 84 is a Model LTC 1441 comparator commercially available from Linear Technology Corporation of Milpitas, Calif. and the power MOSFET 86 is a Model IRF7503 HEXFET power MOSFET commercially available from International Rectifier of El Segundo, Calif.

The channel zero and channel one outputs of sample and hold circuit 86 are connected to a summing amplifier 90 which is utilized with the amplitude mode of operation of handheld GPS jammer locator 10. The channel zero and channel one outputs of sample and hold circuit 86 are also connected to a difference amplifier 92 which is utilized with the DF mode of operation of handheld GPS jammer locator 10. The summing amplifier 90 and the difference amplifier 92 is a single chip Model AD 822 dual precession lower power FET operational amplifier commercially available from Analog Devices of Norwood, Mass. The amplitude mode, which is the summation of the channel zero and one signals, indicates the signal strength of the GPS jamming signal. The difference mode, which is the difference between the channel zero and one signals, indicates the signal direction for the GPS jamming signal. A single pole double throw switch 94 allows a user to select between the amplitude mode and the DF (Direction Finding) mode. The output of switch 94 is connected via a pair of holes 96 and 98 in the control board 80 to a meter. The needle in the meter changes more slowly when signal strength is being measured in the amplitude mode of operation for handheld GPS jammer locator 10 and more rapidly when direction is being determined in the DF mode of operation.

The programmable logic device 50 used in jammer locator 10 is an Altera Model EPM7064STC44-10 Field Programmable Gate Array commercially available from Altera Corporation of San Jose, Calif. A state machine programmed into programmable logic device 50 generates Bit 1 and Bit 2 which are used to switch RF switch 48 and the sample hold control signal used to control multiple channel sample and hold circuit 88.

Control board 80 also provides +5 volts and +7 volts to the electronics components of jammer locator 10. A nine volt battery is connected to a five volt voltage regulator 100 and a seven volt voltage regulator 102 which supply +5 volts and +7 volts to the electronics components of jammer locator 10. Voltage regulator 100 is an Analog Devices model ADP3335 voltage regulator and voltage regulator 102 is an Analog Devices model ADP3334 voltage regulator.

From the foregoing, it is readily apparent that the present invention comprises a new, unique, and exceedingly useful handheld GPS jammer locator for determining the strength and direction of a GPS jamming signal, which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A handheld GPS jammer locator for locating a GPS jamming signal comprising:
    (a) first and second antennas separated by a half wavelength of a GPS carrier frequency, said first and second antennas receiving said GPS jamming signal and providing first and second RF electrical signals at the GPS carrier frequency of approximately 1.575 GHz;
    (b) a quadrature coupler connected to said first and second antennas to receive said first and second RF electrical signals, said quadrature coupler combining said first and second RF electrical signals and than generating third and fourth RF electrical signals representing a pair of displaced antenna beams received by said first and second antenna beams;
    (c) an RF switch connected to said quadrature coupler to receive said third and fourth RF electrical signals, said RF switch, responsive to an RF switching signal, sequentially passing said third and fourth RF signals through said RF switch;
    (d) a logarithmic narrow band receiver connected to said RF switch to receive said third and fourth RF signals passed through said RF switch, said logarithmic narrow band receiver converting said third and fourth RF signals to Intermediate Frequency (IF) signals having a logarithmic scaling factor of approximately zero volts to three volts;

(e) a video switch connected to said logarithmic narrow band receiver to receive said IF signals;

(f) first and second sample/hold circuits connected to said video switch;

(g) said video switch switching said IF signals generating samples of said IF signals and providing the samples of said IF signals to said first and second sample/hold circuits, wherein the samples of said IF signals are provided to said first and second sample/hold circuits and held within said first and second sample/hold circuits at a sampling frequency synchronized to a switching frequency for said RF switch;

(h) a summing amplifier connected to said first and second sample/hold circuits to receive and add the samples of said IF signals held by said first and second sample/hold circuits generating a summed signal which indicates a signal strength for said GPS jamming signal; and (i) a difference amplifier connected to said first and second sample/hold circuits to receive and subtract the samples of said IF signals held by said first and second sample/hold circuits generating a difference signal which indicates a direction of arrival for said GPS jamming signal.

2. The handheld GPS jammer locator of claim 1 further comprising a programmed logic device connected to said RF switch to provide said RF switching signal to said RF switch.

3. The handheld GPS jammer locator of claim 2 wherein said programmed logic device generates a sample hold control signal provided to said video switch and said first and second sample/hold circuits to control sampling of said IF signals by said first and second sample/hold circuits and storage of each sample of said IF signals taken within said first and second sample/hold circuits.

4. The handheld GPS jammer locator of claim 2 further comprising a five volt power supply for providing five volts to said quadrature coupler, said RF switch, said logarithmic narrow band receiver, said programmed logic device, said summing amplifier and said difference amplifier.

5. The handheld GPS jammer locator of claim 1 further comprising a seven volt power supply for providing seven volts to said first and second sample/hold circuits.

6. The handheld GPS jammer locator of claim 1 wherein the switching frequency for said RF switch is within a range of ten hertz to one kilohertz.

7. The handheld GPS jammer locator of claim 1 wherein said RF switching signal is a two bit digital code, said first RF electrical signals from said first antenna pass through said RF switch when bit one of said two bit digital code is active and said second RF electrical signals from said second antenna pass through said RF switch when bit two of said two bit digital code is active.

8. A handheld GPS jammer locator for locating a GPS jamming signal comprising:

(a) first and second antennas separated by a half wavelength of a GPS carrier frequency, said first and second antennas receiving said GPS jamming signal and providing first and second RF electrical signals at the GPS carrier frequency of approximately 1575.42 MHz;

(b) a quadrature coupler connected to said first and second antennas to receive said first and second RF electrical signals, said quadrature coupler combining said first and second RF electrical signals and than generating third and fourth RF electrical signals representing a pair of displaced antenna beams received by said first and second antenna beams;

(c) an RF switch connected to said quadrature coupler to receive said third and fourth RF electrical signals, said RF switch, responsive to an RF switching signal, sequentially passing said third and fourth RF signals through said RF switch;

(d) a logarithmic narrow band receiver connected to said RF switch to received said third and fourth RF signals passed through said RF switch, said logarithmic narrow band receiver converting said third and fourth RF signals to Intermediate Frequency (IF) signals having a logarithmic scaling factor of approximately zero volts to three volts, said logarithmic narrow band receiver including:

(i) an RF low noise amplifier/mixer for mixing said third and fourth RF electrical signals at the GPS carrier frequency of approximately 1575.42 MHz with an external 1505.42 MHz Local Oscillator signal to generate said IF signals;

(ii) a bandpass filter connected to said RF low noise amplifier/mixer, said bandpass filter filtering said IF signal to a bandpass frequency of 70 MHz;

(iii) a log amplifier connected to said bandpass filter, said log amplifier having a log transfer function covering signals within a power level range of +10 dBm to −70 dBm, wherein an output signal from log amplifier is provided as said zero volts to three volts signal which represents the power level range of +10 dBm to −70 dBm for IF signals which are input to said log amplifier;

(e) a video switch connected to said logarithmic narrow band receiver to receive said IF signals;

(f) first and second sample/hold circuits connected to said video switch;

(g) said video switch switching said IF signals generating samples of said IF signals and providing the samples of said IF signals to said first and second sample/hold circuits, wherein the samples of said IF signals are provided to said first and second sample/hold circuits and held within said first and second sample/hold circuits at a sampling frequency synchronized to a switching frequency for said RF switch;

(h) a summing amplifier connected to said first and second sample/hold circuits to receive and add the samples of said IF signals held by said first and second sample/hold circuits generating a summed signal which indicates a signal strength for said GPS jamming signal; and (i) a difference amplifier connected to said first and second sample/hold circuits to receive and subtract the samples of said IF signals held by said first and second sample/hold circuits generating a difference signal which indicates a direction of arrival for said GPS jamming signal.

9. The handheld GPS jammer locator of claim 8 further comprising a programmed logic device connected to said RF switch to provide said RF switching signal to said RF switch.

10. The handheld GPS jammer locator of claim 9 wherein said programmed logic device generates a sample hold control signal provided to said video switch and said first and second sample/hold circuits to control sampling of said IF signals by said first and second sample/hold circuits and storage of each sample of said IF signals taken within said first and second sample/hold circuits.

11. The handheld GPS jammer locator of claim 9 further comprising a five volt power supply for providing five volts to said quadrature coupler, said RF switch, said logarithmic narrow band receiver, said programmed logic device, said summing amplifier and said difference amplifier.

12. The handheld GPS jammer locator of claim 9 further comprising a seven volt power supply for providing seven volts to said first and second sample/hold circuits.

13. The handheld GPS jammer locator of claim 9 wherein the switching frequency for said RF switch is within a range of ten hertz to one kilohertz.

14. The handheld GPS jammer locator of claim 9 wherein said RF switching signal is a two bit digital code, said first RF electrical signals from said first antenna passing through said RF switch when bit one of said two bit digital code is active and said second RF electrical signals from said second antenna passing through said RF switch when bit two of said two bit digital code is active.

15. A handheld GPS jammer locator for locating a GPS jamming signal comprising:
   (a) first and second antennas separated by a half wavelength of a GPS carrier frequency, said first and second antennas receiving said GPS jamming signal and providing first and second RF electrical signals at the GPS carrier frequency of approximately 1575 MHz;
   (b) a quadrature coupler connected to said first and second antennas to receive said first and second RF electrical signals, said quadrature coupler combining said first and second RF electrical signals and than generating third and fourth RF electrical signals representing a pair of displaced antenna beams received by said first and second antenna beams;
   (c) an RF switch connected to said quadrature coupler to receive said third and fourth RF electrical signals, said RF switch, responsive to an RF switching signal, sequentially passing said third and fourth RF signals through said RF switch;
   (d) a logarithmic narrow band receiver connected to said RF switch to received said third and fourth RF signals passed through said RF switch, said logarithmic narrow band receiver converting said third and fourth RF signals to Intermediate Frequency (IF) signals having a logarithmic scaling factor of approximately zero volts to three volts, said logarithmic narrow band receiver including:
      (i) an RF low noise amplifier/mixer for mixing said third and fourth RF electrical signals at a frequency of 1575.42 MHz with a 1505.42 MHz Local Oscillator signal to generate said IF signals;
      (ii) a local oscillator synthesizer connected to said RF low noise amplifier/mixer to provide said 1505.42 MHz Local Oscillator signal to said RF low noise amplifier/mixer;
      (iii) a reference oscillator connected to said local oscillator synthesizer, said oscillator providing a 10 MHz reference signal to said local oscillator synthesizer which then generates 1505.42 MHz Local Oscillator signal in response to said 10 MHz reference signal;
      (iv) a first bandpass filter having a signal input and a signal output connected to said RF low noise amplifier/mixer, said first bandpass filter filtering said third and fourth RF electrical signals to said frequency of 1575.42 MHz and then returning said third and fourth RF electrical signals to said RF low noise amplifier/mixer;
      (v) a second bandpass filter connected to a signal output of said RF low noise amplifier/mixer, said second bandpass filter filtering said IF signal to a bandpass frequency of 70 MHz;
      (vi) a log amplifier connected to said bandpass filter, said log amplifier having a log transfer function covering signals within a power level range of +10 dBm to −70 dBm, wherein an output signal from log amplifier is provided as said zero volts to three volts signal which represents the power level range of +10 dBm to −70 dBm for IF signals which are input to said log amplifier;
   (e) a comparator connected to said log amplifier, said comparator being configured to provide a threshold voltage of 10 millivolts wherein input signals below said threshold voltage of 10 millivolts are noise signal and are clamped to ground;
   (f) a video switch connected to said comparator to receive said IF signals from said comparator;
   (g) first and second sample/hold circuits connected to said video switch;
   (h) said video switch switching said IF signals generating samples of said IF signals and providing the samples of said IF signals to said first and second sample/hold circuits, wherein the samples of said IF signals are provided to said first and second sample/hold circuits and held within said first and second sample/hold circuits at a sampling frequency synchronized to a switching frequency for said RF switch;
   (i) a summing amplifier connected to said first and second sample/hold circuits to receive and add the samples of said IF signals held by said first and second sample/hold circuits generating a summed signal which indicates a signal strength for said GPS jamming signal;
   (j) a difference amplifier connected to said first and second sample/hold circuits to receive and subtract the samples of said IF signals held by said first and second sample/hold circuits generating a difference signal which indicates a direction of arrival for said GPS jamming signal; and
   (k) a programmed logic device connected to said RF switch to provide said RF switching signal to said RF switch.

16. The handheld GPS jammer locator of claim 15 wherein said programmed logic device generates a sample hold control signal provided to said video switch and said first and second sample/hold circuits to control sampling of said IF signals by said first and second sample/hold circuits and storage of each sample of said IF signals taken within said first and second sample/hold circuits.

17. The handheld GPS jammer locator of claim 15 further comprising a five volt power supply for providing five volts to said quadrature coupler, said RF switch, said logarithmic narrow band receiver, said programmed logic device, said summing amplifier and said difference amplifier.

18. The handheld GPS jammer locator of claim 15 further comprising a seven volt power supply for providing seven volts to said first and second sample/hold circuits.

19. The handheld GPS jammer locator of claim 15 wherein the switching frequency for said RF switch is within a range of ten hertz to one kilohertz.

20. The handheld GPS jammer locator of claim 15 wherein said RF switching signal is a two bit digital code, said first RF electrical signals from said first antenna passing through said RF switch when bit one of said two bit digital code is active and said second RF electrical signals from said second antenna passing through said RF switch when bit two of said two bit digital code is active.

* * * * *